United States Patent
Leezer et al.

(10) Patent No.: US 9,950,381 B2
(45) Date of Patent: Apr. 24, 2018

(54) TUBE COUPLING AND A METHOD FOR FORMING A TUBE COUPLING

(71) Applicant: General Electric Company, Schenectady, NY (US)

(72) Inventors: David Andrew Leezer, Louisville, KY (US); Mark A. Zaccone, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 673 days.

(21) Appl. No.: 14/446,647

(22) Filed: Jul. 30, 2014

(65) Prior Publication Data
US 2016/0033181 A1    Feb. 4, 2016

(51) Int. Cl.

| | |
|---|---|
| *F25B 39/02* | (2006.01) |
| *B23K 31/02* | (2006.01) |
| *B21D 39/06* | (2006.01) |
| *B21D 53/00* | (2006.01) |
| *B23P 15/26* | (2006.01) |
| *B21D 51/38* | (2006.01) |
| *B21D 21/00* | (2006.01) |
| *B23K 31/00* | (2006.01) |
| *B23K 1/00* | (2006.01) |
| *B23K 1/19* | (2006.01) |
| *F16L 13/02* | (2006.01) |
| *B23K 101/04* | (2006.01) |

(Continued)

(52) U.S. Cl.
CPC .............. *B23K 1/0012* (2013.01); *B23K 1/19* (2013.01); *B23K 31/02* (2013.01); *B23K 2201/04* (2013.01); *B23K 2201/14* (2013.01); *B23K 2203/10* (2013.01); *B23K 2203/12* (2013.01); *B23K 2203/18* (2013.01); *F16L 13/02* (2013.01)

(58) Field of Classification Search
CPC ................ B23K 2203/18; B23K 11/20; B23K 2201/06; B23K 2203/10; B23K 2203/12
USPC ...... 219/118; 228/183; 29/890.043, 890.052, 29/890.053, 890.054; 62/526
See application file for complete search history.

(56) References Cited

U.S. PATENT DOCUMENTS 1,997,538 A * 4/1935 Armstrong ........... B23K 20/227
                                                        164/75
2,823,933 A * 2/1958 Hickman ............. F16L 13/007
                                                        285/148.12

(Continued)

FOREIGN PATENT DOCUMENTS

| JP | 56062685 A * | 5/1981 | ............. B23K 20/00 |
| JP | 1133747 A | 2/1999 | |
| JP | 2001165362 A * | 6/2001 | |

OTHER PUBLICATIONS

Publication entitled "Effect of Annealing on the Interfacial Structure of Aluminum-Copper Joints" by Chen, Jan. 13, 2007.*

*Primary Examiner* — Len Tran
*Assistant Examiner* — Paul Alvare
(74) *Attorney, Agent, or Firm* — Dority & Manning, P.A.

(57) ABSTRACT

A method for forming a tube coupling includes forming a metallurgical joint between a copper tube and an aluminum tube and annealing the copper tube and the aluminum tube after forming the metallurgical joint. The metallurgical joint has a eutectic region and an intermetallic region after annealing the copper tube and the aluminum tube. The method may assist with improving a performance of the metallurgical joint. A related tube coupling and evaporator are also provided.

17 Claims, 6 Drawing Sheets

(51) Int. Cl.
  *B23K 101/14* (2006.01)
  *B23K 103/10* (2006.01)
  *B23K 103/12* (2006.01)
  *B23K 103/18* (2006.01)

(56) References Cited

U.S. PATENT DOCUMENTS

| | | | | |
|---|---|---|---|---|
| 2,977,675 A * | 4/1961 | Simms | ............... | B23K 9/232 |
| | | | | 219/137 R |
| 3,042,428 A * | 7/1962 | Gardiner | ............ | B21C 37/28 |
| | | | | 228/115 |
| 3,121,785 A * | 2/1964 | Terrill | ............ | B23K 20/2336 |
| | | | | 219/118 |
| 3,735,479 A * | 5/1973 | Rhee | .................. | B23K 20/00 |
| | | | | 228/193 |
| 3,934,784 A * | 1/1976 | Tessmann | ............ | B23K 23/00 |
| | | | | 174/90 |
| 5,338,072 A * | 8/1994 | Bitter | .................. | F16L 13/08 |
| | | | | 228/198 |
| 5,549,335 A * | 8/1996 | Wohrstein | ............ | F16L 13/0209 |
| | | | | 228/198 |
| 6,149,049 A * | 11/2000 | Loftfield | ............ | B23K 1/0012 |
| | | | | 219/78.15 |
| 2005/0029333 A1* | 2/2005 | Koyama | ............... | B23K 1/19 |
| | | | | 228/245 |
| 2005/0263568 A1* | 12/2005 | Stol | .................. | B23K 20/085 |
| | | | | 228/107 |
| 2011/0290364 A1* | 12/2011 | Biris | .................. | B21C 23/002 |
| | | | | 138/140 |

\* cited by examiner

TUBE COUPLING AND A METHOD FOR FORMING A TUBE COUPLING

FIELD OF THE INVENTION

The present subject matter relates generally to tube couplings, such as tube couplings for joining disparate metals on evaporators.

BACKGROUND OF THE INVENTION

Certain water heater appliances include a sealed system for heating water within a tank of the water heater appliance. The sealed systems generally include an evaporator. The evaporator may be formed from a variety of metals, such as copper and/or aluminum. Previously, certain evaporator components were formed with copper. However, with recent copper price increases, aluminum frequently replaces copper in such evaporator components in order to avoid the price increases.

Incorporating aluminum into evaporator components poses certain challenges. For example, joining aluminum components to copper components within the sealed system can be difficult and expensive due to the different material properties of the metals. Transitioning between copper tubing and aluminum evaporator component can be done with several methods including brazing, mechanical clinching and resistive autogenous fusion or welding. Brazing involves the use of costly filler metals and fluxes and mechanical clinching may provide a less reliable joint. Resistive autogenous fusion or welding can be inexpensive and provide a reliable joint. However, maintaining consistent process parameters during resistive autogenous fusion or welding in order to provide a suitable bond between copper tubing and aluminum evaporator components is difficult. When the process parameters are inconsistent, the bond may be undersized, brittle and not fully bonded thus resulting in unreliable joints.

According, a method for joining copper and aluminum components that assists with provides a reliable bond between the copper and aluminum components would be useful. In particular, a method for joining copper and aluminum tubing within an evaporator that assists with provides a reliable bond between the copper and aluminum tubing would be useful.

BRIEF DESCRIPTION OF THE INVENTION

The present subject matter provides a method for forming a tube coupling. The method includes forming a metallurgical joint between a copper tube and an aluminum tube and annealing the copper tube and the aluminum tube after forming the metallurgical joint. The metallurgical joint has a eutectic region and an intermetallic region after annealing the copper tube and the aluminum tube. The method may assist with improving a performance of the metallurgical joint. A related tube coupling and evaporator are also provided. Additional aspects and advantages of the invention will be set forth in part in the following description, or may be apparent from the description, or may be learned through practice of the invention.

In a first exemplary embodiment, a tube coupling is provided. The tube coupling defines an axial direction, a radial direction and a circumferential direction. The tube coupling includes an aluminum tube and a copper tube. The copper tube extends between a first end portion and a second end portion along the axial direction. The copper tube is positioned within the aluminum tube at the first end portion of the copper tube. The copper tube and the aluminum tube define a metallurgical joint therebetween at the first end portion of the copper tube. The metallurgical joint includes a eutectic region and an intermetallic region. The eutectic region of the metallurgical joint extends along the radial direction between the aluminum tube and the intermetallic region of the metallurgical joint. The intermetallic region of the metallurgical joint extends along the radial direction between the eutectic region of the metallurgical joint and the copper tube.

In a second exemplary embodiment, a method for forming a tube coupling is provided. The method includes positioning a copper tube adjacent an aluminum tube such that the copper tube is in axial alignment with the aluminum tube, heating at least one of the copper tube and the aluminum tube to at least a eutectic temperature of aluminum and copper, urging the copper tube and the aluminum tube together such that an end portion of the copper tube is disposed within the aluminum tube, cooling the copper tube and the aluminum tube in order to form a metallurgical joint between the copper tube and the aluminum tube, and annealing the copper tube and the aluminum tube after the step of cooling. The metallurgical joint has a eutectic region and an intermetallic region after the step of annealing. The eutectic region of the metallurgical joint is positioned between the aluminum tube and the intermetallic region of the metallurgical joint along a radial direction of the tube coupling. The intermetallic region of the metallurgical joint is positioned between the eutectic region of the metallurgical joint and the copper tube along the radial direction of the tube coupling.

In a third exemplary embodiment, an evaporator for a hot water heater appliance is provided. The evaporator includes an aluminum evaporator conduit that has an opening. The opening of the aluminum evaporator conduit is configured for directing refrigerant therethrough. A jumper tube is positioned adjacent the aluminum evaporator conduit. The jumper tube defines an axial direction and a radial direction. The jumper tube includes an aluminum tube mounted to the aluminum evaporator tube at the opening of the aluminum evaporator tube. A copper tube extends between a first end portion and a second end portion along the axial direction. The copper tube is positioned within the aluminum tube at the first end portion of the copper tube. The copper tube and the aluminum tube define a metallurgical joint therebetween at the first end portion of the copper tube. The metallurgical joint includes a eutectic region and an intermetallic region. The eutectic region of the metallurgical joint is positioned between the aluminum tube and the intermetallic region of the metallurgical joint along the radial direction. The intermetallic region of the metallurgical joint is positioned between the eutectic region of the metallurgical joint and the copper tube along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
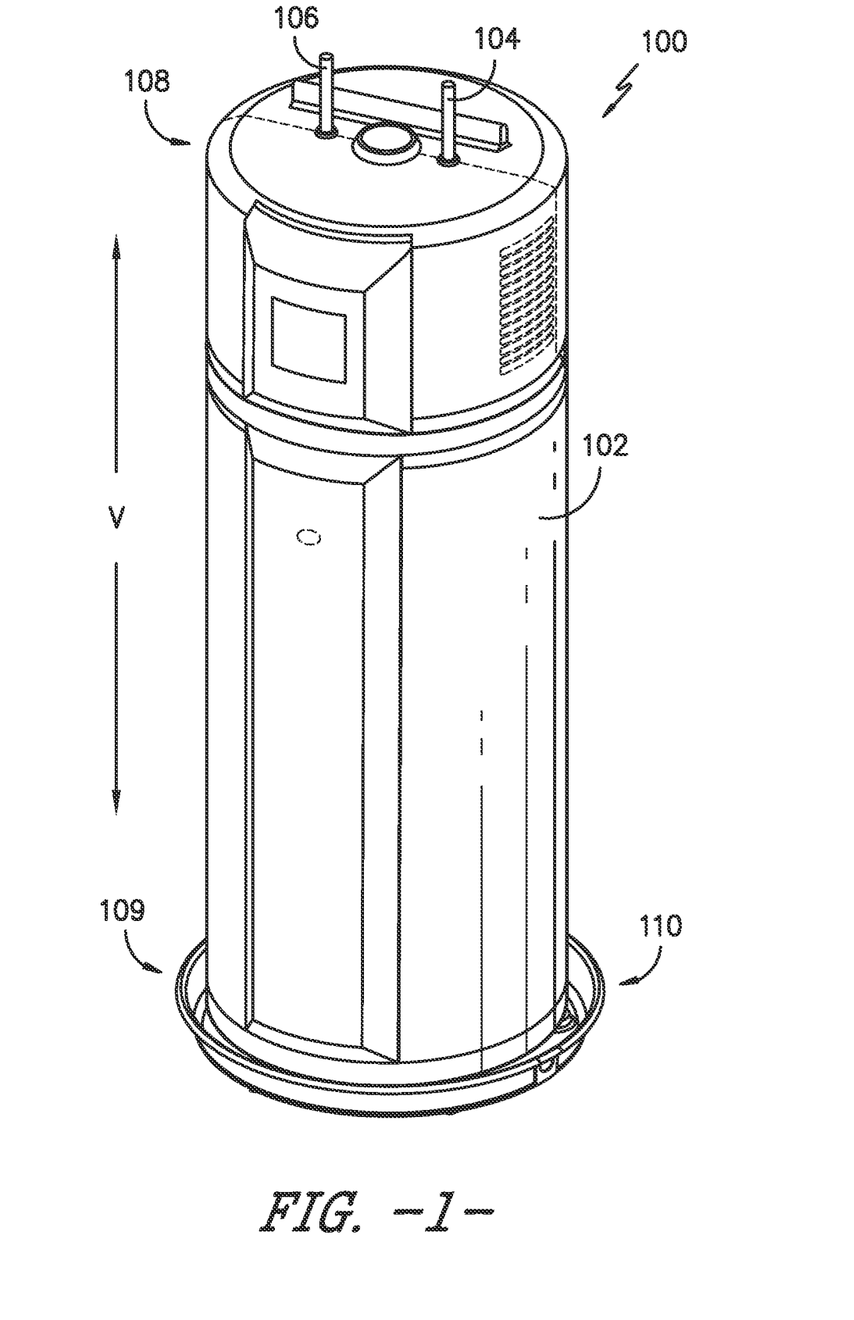
FIG. 1 provides a perspective view of a water heater appliance according to an exemplary embodiment of the present subject matter.

FIG. 1 provides a perspective view of a water heater appliance 100 according to an exemplary embodiment of the present subject matter. Water heater appliance 100 includes an outer shell or casing 102. Casing 102 generally surrounds a tank 112 (FIG. 2) such that tank 112 is disposed within casing 102. Upper and lower heating elements 118, 119 (FIG. 2) and a sealed system 120 (FIG. 2) may also be positioned within casing 102 for heating water within tank 112. Upper and lower heating elements 118, 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes an inlet or cold water conduit 104 and an outlet or hot water conduit 106 that are both in fluid communication with a chamber or interior volume 114 (FIG. 2) defined by tank 112. As an example, cold water from a water source, e.g., a municipal water supply or a well, can enter water heater appliance 100 through cold water conduit 104. From cold water conduit 104, such cold water can enter interior volume 114 of tank 112 wherein it is heated with heating elements 118, 119 and/or sealed system 120 to generate heated water. Such heated water can exit water heater appliance 100 at hot water conduit 106 and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 (FIG. 2) of water heater appliance 100. It should be understood that water heater appliance 100 is provided by way of example only and that the present subject matter may be used with any suitable water heater appliance.

Figure 2:
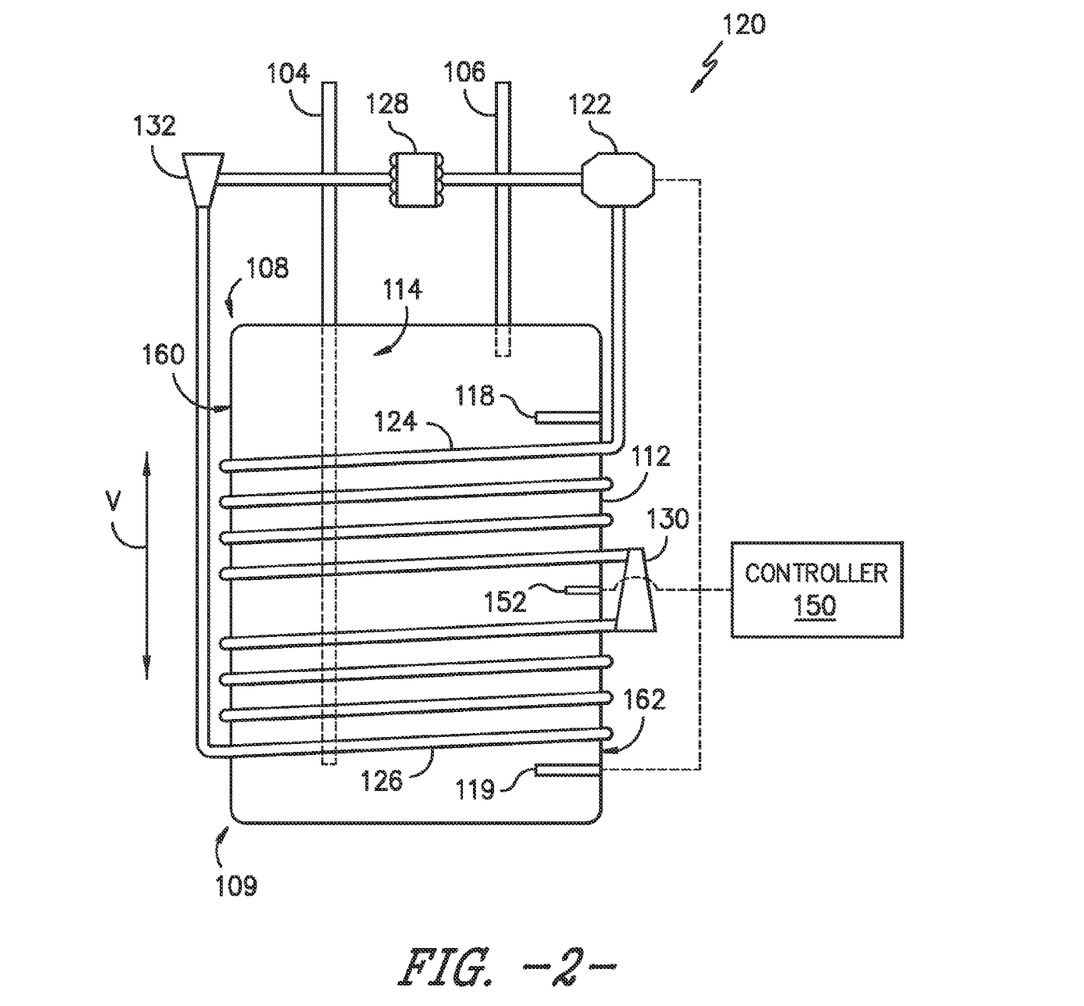
FIG. 2 provides a schematic view of certain components of the exemplary water heater appliance of FIG. 1.

FIG. 2 provides a schematic view of certain components of water heater appliance 100. As may be seen in FIG. 2, water heater appliance 100 may include sealed system 120 for heating water within interior volume 114 of tank 112. Sealed system 120 generally operates in a heat pump cycle. Thus, water heater appliance 100 is commonly referred to as a "heat pump water heater appliance." Water heater appliance 100 may additionally include one or more auxiliary heating elements, such as upper heating element 118 and/or lower heating element 119.

Sealed system 120 may include a compressor 122, a first condenser 124, a second condenser 126 and an evaporator 128. Compressor 122 and/or evaporator 128 of sealed system 120 may be disposed within casing 102 at top portion 108 of water heater appliance 100. As is generally understood, various conduits may be utilized to flow refrigerant between the various components of sealed system 120. Thus, e.g., evaporator 128 may be between and in fluid communication with second condenser 126 and compressor 122. During operation of sealed system 120, refrigerant may flow from evaporator 128 through compressor 122. For example, refrigerant may exit evaporator 128 as a fluid in the form of a superheated vapor and/or high quality vapor mixture. Upon exiting evaporator 128, the refrigerant may enter compressor 122. Compressor 122 may be operable to compress the refrigerant. Accordingly, the pressure and temperature of the refrigerant may be increased in compressor 122 such that the refrigerant becomes a superheated vapor.

Each condenser 124, 126 may be assembled in a heat exchange relationship with tank 112 in order to heat water within interior volume 114 of tank 112 during operation of sealed system 120. First condenser 124 may be positioned downstream of and in fluid communication with compressor 122, and may be operable to heat the water within interior volume 114 using energy from the refrigerant. For example, the superheated vapor from compressor 122 may enter first condenser 124 wherein it transfers energy to the water within tank 112 and condenses into a saturated liquid and/or liquid vapor mixture. Second condenser 126 may be positioned downstream of and in fluid communication with first condenser 124, and may additionally be operable to heat the water within interior volume 114 using energy from the refrigerant, such as by further condensing the refrigerant.

Sealed system 120 may also include a first throttling device 130 between first condenser 124 and second condenser 126, and/or a second throttling device 132 between second condenser 126 and evaporator 128. Refrigerant, which may be in the form saturated liquid vapor mixture, may exit first condenser 124 and travel through first throttling device 130 before flowing through second condenser 126. First throttling device 130 may generally expand the refrigerant, lowering the pressure and temperature thereof The refrigerant may then be flowed through second condenser 126. Similarly, refrigerant, which may be in the form of high quality/saturated liquid vapor mixture, may exit second condenser 126 and travel through second throttling device 132 before flowing through evaporator 128. Second throttling device 132 may generally expand the refrigerant, lowering the pressure and temperature thereof The refrigerant may then be flowed through evaporator 128.

First and second throttling devices 130, 132 may be any suitable components for generally expanding the refrigerant. For example, in some exemplary embodiments, first and second throttling device 130, 132 may be a Joule-Thomson expansion valve, also known as a "J-T valve." In other exemplary embodiments, first and second throttling device 130, 132 may be an ejector. In still other exemplary embodiments, a capillary tube, fixed orifice, or other suitable apparatus may be utilized as first and second throttling device 130, 132.

Water heater appliance 100 may additionally include a temperature sensor 152. Temperature sensor 152 may be configured for measuring a temperature of water within interior volume 114 of tank 112. Temperature sensor 152 can be positioned at any suitable location within water heater appliance 100. For example, temperature sensor 152 may be positioned within interior volume 114 of tank 112 or may be mounted to tank 112 outside of interior volume 114 of tank 112. Temperature sensor 152 may further be positioned within upper portion 160 or lower portion 162. When mounted to tank 112 outside of interior volume 114 of tank 112, temperature sensor 152 can be configured for indirectly measuring the temperature of water within interior volume 114 of tank 112. For example, temperature sensor 152 can measure the temperature of tank 112 and correlate the temperature of tank 112 to the temperature of water within interior volume 114 of tank 112. Temperature sensor 152 may be any suitable temperature sensor. For example, temperature sensor 152 may be a thermocouple or a thermistor.

Water heater appliance 100 may further include a controller 150 that regulates operation of water heater appliance 100. Controller 150 may be, for example, in operative communication with sealed system 120 (such as compressor 122, and/or other components thereof), auxiliary heating elements, and/or temperature sensor 152. Thus, controller 150 can selectively activate system 120 and/or auxiliary heating elements in order to heat water within interior volume 114 of tank 112.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 3:
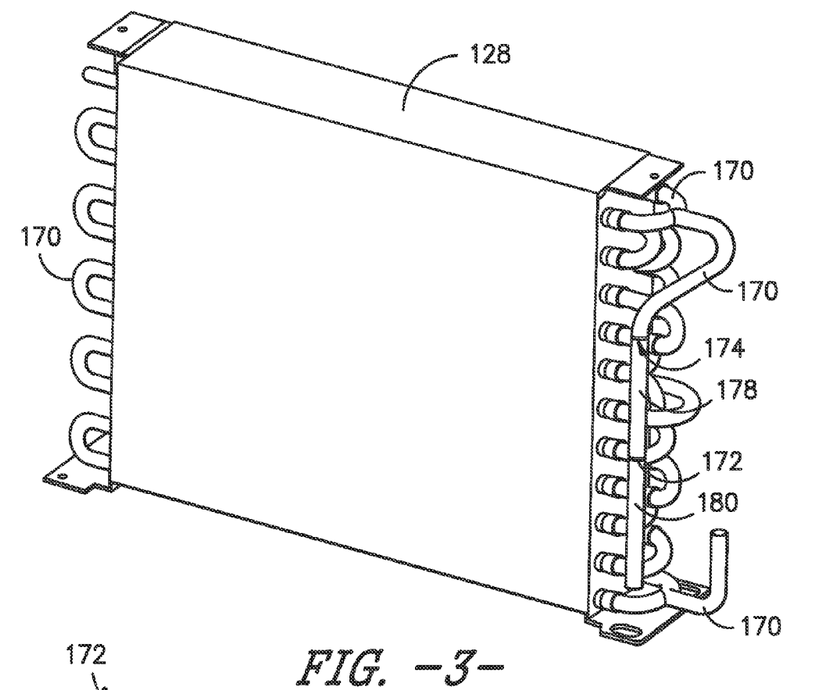
FIG. 3 provides a perspective view of an evaporator of the exemplary water heater appliance of FIG. 1.

FIG. 3 provides a perspective view of evaporator 128 of sealed system 120. Evaporator 128 may be constructed of or with any suitable material. For example, evaporator 128 may include an evaporator conduit 170, and evaporator conduit 170 may be constructed of or with copper or aluminum. As will be understood by those skilled in the art, other components or conduits of sealed system 120 may be constructed of or with different materials than evaporator conduit 170. Thus, water heater appliance 100 includes a tube coupling or jumper tube 172 for assisting with joining evaporator conduit 170 with other components of sealed system 120 that are constructed of or with dissimilar materials. For example, evaporator conduit 170 may be constructed of or with aluminum and a conduit extending from evaporator 128 to compressor 122 may be constructed of or with copper. Thus, jumper tube 172 may assist with transitioning or connecting evaporator conduit 170 and the conduit extending from evaporator 128 to compressor 122 when such components are dissimilar metals.

As may be seen in FIG. 3, evaporator conduit 170 has an opening 174. Opening 174 of evaporator conduit 170 may be an inlet or an outlet of evaporator 128. Thus, refrigerant may flow into or out of evaporator 128 via opening 174 of evaporator conduit 170. Jumper tube 172 is positioned adjacent and mounted to evaporator conduit 170, e.g., at opening 174 of evaporator conduit 170. Thus, jumper tube 172 may receive refrigerant from evaporator 128 and direct such refrigerant towards downstream components of sealed system 120.

Figure 4:
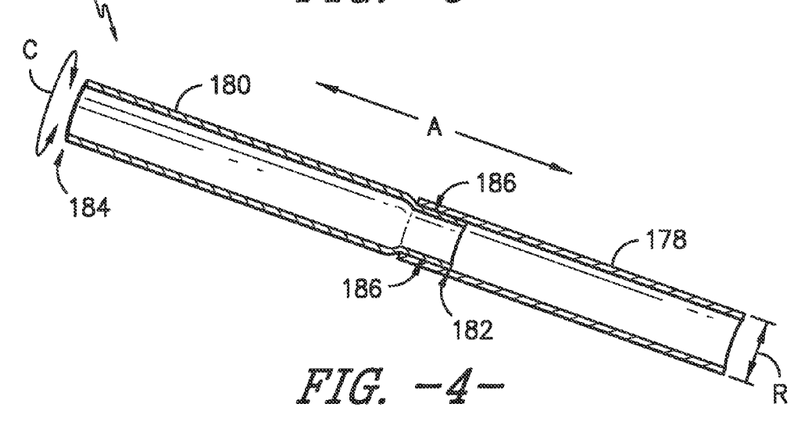
FIG. 4 provides a perspective, section view of a jumper tube of the evaporator of FIG. 3.

FIG. 4 provides a perspective, section view of jumper tube 172 of evaporator 128. As may be seen in FIG. 4, jumper tube 172 defines an axial direction A, a radial direction R and a circumferential direction C. Jumper tube 172 also includes an aluminum tube 178 and a copper tube 180. Copper tube 180 extends between a first end portion 182 and a second end portion 184, e.g., along the axial direction A. Copper tube 180 is positioned within aluminum tube 178, e.g., at first end portion 182 of copper tube 180. Copper tube 180 and aluminum tube 178 define or form a metallurgical joint 186 therebetween, e.g., at or adjacent first end portion 182 of copper tube 180. Metallurgical joint 186 connects and couples aluminum and copper tubes 178, 180 together. Metallurgical joint 186 and methods for forming and treating metallurgical joint 186 are discussed in greater detail below.

Figure 5:
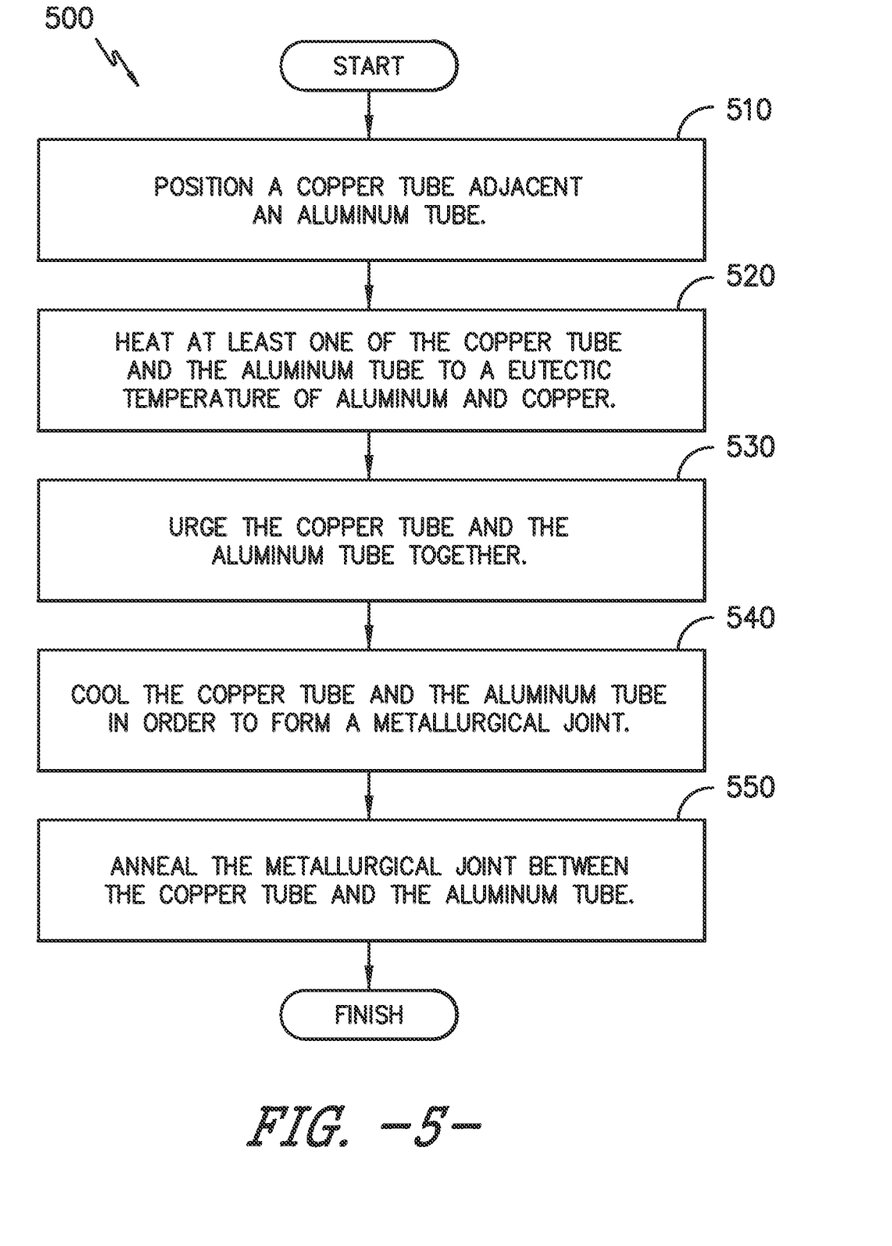
FIG. 5 illustrates a method for forming a tube coupling according to an exemplary embodiment of the present subject matter.

FIG. 5 illustrates a method 500 for forming a tube coupling or jumper tube according to an exemplary embodiment of the present subject matter. Method 500 is described below in the context of forming and/or treating jumper tube 172. However, it should be understood that method 500 may be used to form or treat any suitable coupling of copper and aluminum tubing or conduits. For example, method 500 may be used to form or treat couplings between copper and aluminum tubes for HVAC systems, refrigerator appliances, etc.

Figure 6:
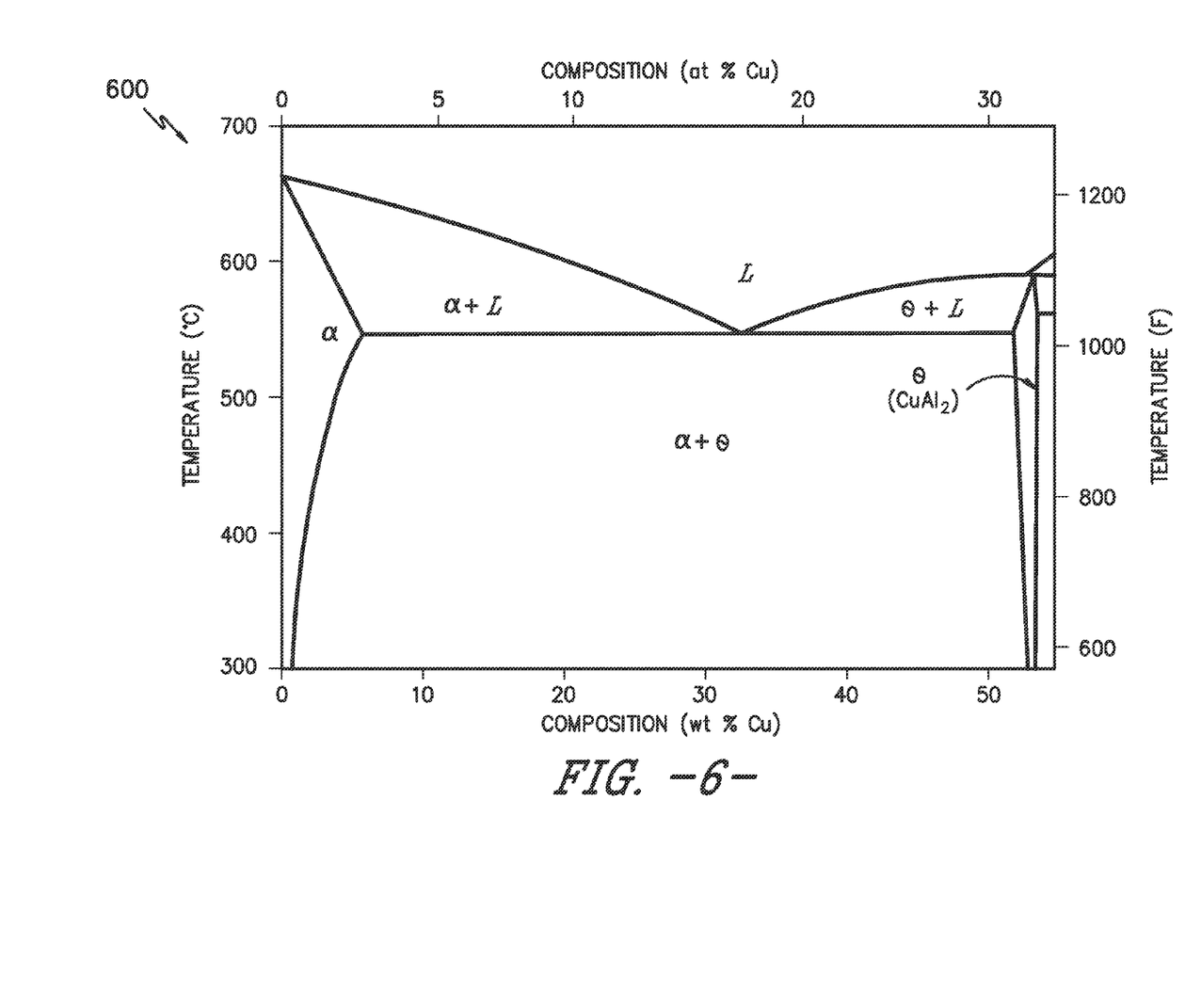
FIG. 6 provides a phase diagram of copper and aluminum.

At step 510, copper tube 180 is positioned adjacent aluminum tube 178. As an example, a worker may place copper tube 180 adjacent aluminum tube 178 such that copper tube 180 is in alignment or coaxial with aluminum tube 178 along the axial direction. At step 520, at least one of copper tube 180 and aluminum tube 178 may be heated. In particular, an induction heating coil, gas burner or any other suitable heating element may be used to heat at least one of copper tube 180 and aluminum tube 178 to at least the eutectic temperature of aluminum and copper at step 520. FIG. 6 provides a phase diagram 600 of copper and aluminum. As may be seen in FIG. 6, the eutectic temperature of aluminum and copper is approximately one thousand and eighteen degrees Fahrenheit.

At step 530, copper tube 180 and aluminum tube 178 are urged together, e.g., while at least one of copper tube 180 and aluminum tube 178 is still heated to at least the eutectic temperature of aluminum and copper (such that the temperature is greater the melting point of aluminum). For example, a hydraulic piston or other suitable linear actuator may urge copper tube 180 and aluminum tube 178 together such that first end portion 182 of copper tube 180 is disposed within aluminum tube 178 at step 530. At step 540, copper tube 180 and aluminum tube 178 are cooled in order to form or solidify metallurgical joint 186 between copper tube 180 and aluminum tube 178. Thus, after pushing copper tube 180 into aluminum tube 178, the heating element from step 520 may be deactivated and copper tube 180 and aluminum tube 178 may cool in order to form or solidify metallurgical joint 186.

Steps 520-540 may be performed quickly in order to avoid melting aluminum tube 178. If performed quickly, such fast heating and solidification may not provide a suitable metallurgical joint 186 between copper tube 180 and aluminum tube 178. For example, metallurgical joint 186 may include copper in a solution of melted and resolidified aluminum within a joint region 187 after step 540. In particular, after step 540, metallurgical joint 186 may include aluminum with copper in solution in varying amounts within joint region 187 depending on the heating and dwell time of steps 520-540. For the copper to go into solution to form a suitable metallurgical joint 186, an oxide layer on copper tube 180 must be disrupted by the pressure applied during step 530. However, aluminum has very low strength so the pressure is generally limited and highly variable. Due to such factors, metallurgical joint 186 at step 540 may be unreliable and fail over the life of hot water heater appliance 100.

At step 550, copper tube 180 and aluminum tube 178 are annealed after step 530. Thus, metallurgical joint 186 between copper tube 180 and aluminum tube 178 is annealed at step 550. Metallurgical joint 186 has a eutectic region 188 (FIG. 8) and an intermetallic region 190 (FIG. 8) after step 550, as discussed in greater detail below. As an example, copper tube 180 and aluminum tube 178 (e.g., metallurgical joint 186) may be heated to a particular temperature at step 550. In addition, copper tube 180 and aluminum tube 178 (e.g., metallurgical joint 186) may be maintained, e.g., in an inert atmosphere, such as nitrogen, at the particular temperature for a period of time at step 550. The particular temperature may be any suitable temperature. For example, the particular temperature may be greater than five hundred degrees Fahrenheit and less than seven hundred degrees Fahrenheit. As another example, the particular temperature may be greater than five hundred and fifty degrees Fahrenheit and less than six hundred and fifty degrees Fahrenheit. As yet another example, the particular temperature may be about (e.g., within about one hundred degrees Fahrenheit of) six hundred degrees Fahrenheit. Similarly, the period of time may be any suitable period of time. For example, the period of time may be greater than thirty minutes and less than twenty-four hours.

After step 550, jumper tube 172 may be mounted to evaporator 128. In particular, aluminum tube 178 may be mounted to evaporator conduit 170 of evaporator 128. In particular, aluminum tube 178 may be brazed to evaporator conduit 170 at opening 172 of evaporator conduit 170.

Figure 7:
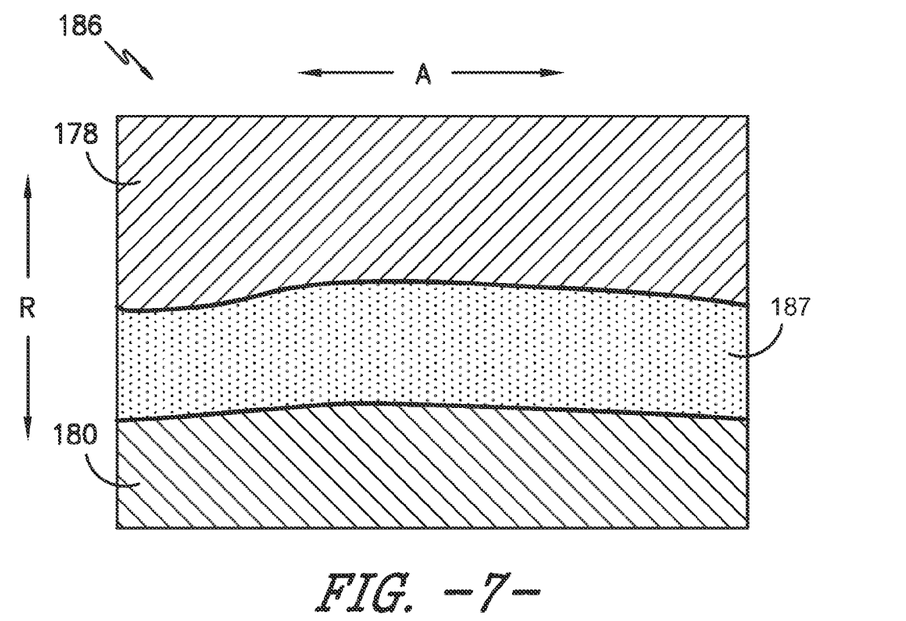
FIG. 7 provides a section view of an unannealed metallurgical joint between a copper tube and an aluminum tube according to an exemplary embodiment of the present subject matter.
Figure 8:
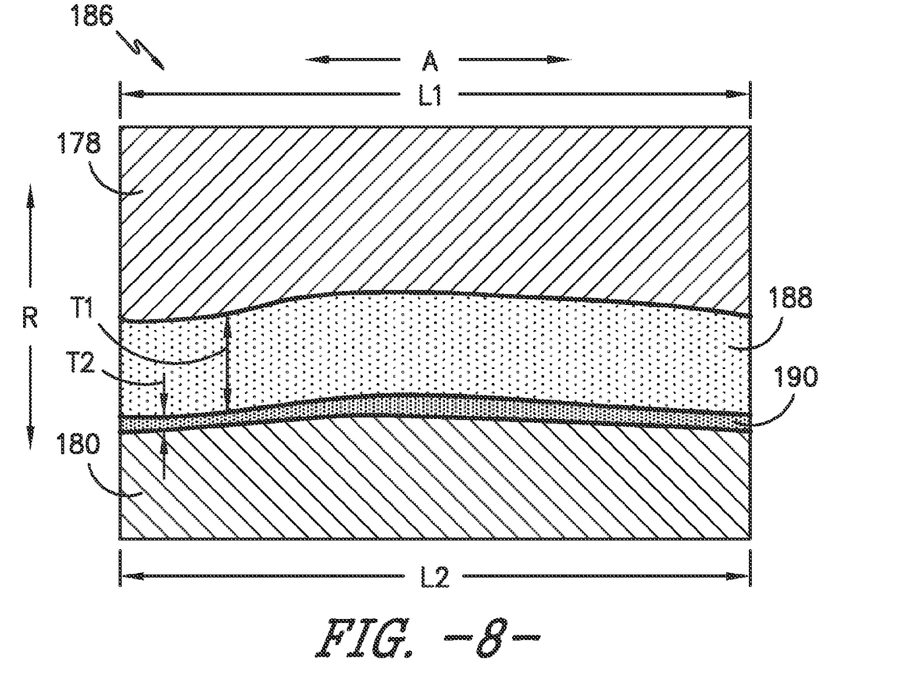
FIG. 8 provides a section view of an annealed metallurgical joint between a copper tube and an aluminum tube according to an exemplary embodiment of the present subject matter.

Utilizing method 500, metallurgical joint 186 may provide a strong, consistent and uniform connection or coupling between aluminum tube 178 and copper tube 180. Method 500 is discussed in greater detail below with respect to FIGS. 7 and 8. FIG. 7 provides a section view of metallurgical joint 186 between copper tube 180 and aluminum tube 178 prior to step 550. FIG. 8 provides a section view of metallurgical joint 186 between copper tube 180 and aluminum tube 178 after step 550. As may be seen in FIGS. 7 and 8, metallurgical joint 186 includes a eutectic region 188 and an intermetallic region 190 after step 550. Conversely, metallurgical joint 186 does not include (or includes a minute or small amount of) eutectic region 188 and intermetallic region 190. In particular, prior to step 550, metallurgical joint 186 may contain aluminum with varying amounts of copper in solution within joint area 187 and in isolated areas aluminum-copper eutectic may form depending on the copper concentration. Thus, step 550 of method 500 may assist with forming and/or growing intermetallic region 190 and eutectic region 188 within metallurgical joint 186. Eutectic region 188 and intermetallic region 190 may assist with strengthening metallurgical joint 186 and thereby better couple aluminum and copper tubes 178, 180 together.

As may be seen in FIG. 8, after step 550, metallurgical joint 186 includes a eutectic region 188 and intermetallic region 190. Eutectic region 188 of metallurgical joint 186 is positioned between aluminum tube 178 and intermetallic region 190 of metallurgical joint 186, e.g., along the radial direction R. Conversely, intermetallic region 190 of metallurgical joint 186 is positioned between eutectic region 188 of metallurgical joint 186 and copper tube 180, e.g., along the radial direction R. In certain exemplary embodiments, eutectic region 188 of metallurgical joint 186 extends along the radial direction R between aluminum tube 178 and intermetallic region 190 of metallurgical joint 186, and intermetallic region 190 of metallurgical joint 186 extends along the radial direction R between eutectic region 188 of metallurgical joint 186 and copper tube 180. Eutectic region 188 and intermetallic region 190 may also extend about copper tube 180 along the circumferential direction C.

Eutectic region 188 includes a eutectic mixture of copper and aluminum, as shown in FIG. 6. In addition, eutectic region 188 of metallurgical joint 186 may include any suitable amount of copper. For example, eutectic region 188 of metallurgical joint 186 may include more than thirty percent copper by weight and less than forty percent copper by weight. In particular, as may be seen in FIG. 6, eutectic region 188 of metallurgical joint 186 may include approximately thirty-three percent copper by weight. Eutectic region 188 of metallurgical joint 186 may also include any suitable amount of aluminum. For example, eutectic region 188 of metallurgical joint 186 may include less than seventy percent aluminum by weight and more than sixty percent aluminum by weight. In particular, as may be seen in FIG. 6, eutectic region 188 of metallurgical joint 186 may include approximately sixty-six percent aluminum by weight.

Intermetallic region 190 includes copper aluminide, $CuAl_2$, as may be seen in FIG. 6. In addition, intermetallic region 190 of metallurgical joint 186 may include any suitable amount of copper. For example, intermetallic region 190 of metallurgical joint 186 may include more than fifty percent copper by weight and less than sixty percent copper by weight. In particular, as may be seen in FIG. 6, intermetallic region 190 of metallurgical joint 186 may include approximately fifty-five percent copper by weight. Intermetallic region 190 of metallurgical joint 186 may also include any suitable amount of aluminum. For example, intermetallic region 190 of metallurgical joint 186 may include less than fifty percent aluminum by weight and more than forty percent aluminum by weight. In particular, as may be seen in FIG. 6, intermetallic region 190 of metallurgical joint 186 may include approximately forty-five percent aluminum by weight.

Metallurgical joint 186 between copper tube 180 and aluminum tube 178 may have any suitable size. As may be seen in FIG. 8, eutectic region 188 of metallurgical joint 186 defines a length L1, e.g., along the axial direction A. Similarly, intermetallic region 190 of metallurgical joint 186 defines a length L2, e.g., along the axial direction A. The lengths L1, L2 of eutectic and intermetallic regions 188, 190 may be any suitable lengths. For example, the length L1 of eutectic region 188 may be greater than one sixteenth of an inch, and the length L2 of intermetallic region 190 may also be greater than one sixteenth of an inch. As another example, the length L1 of eutectic region 188 may be greater than one tenth of an inch and less than one quarter of an inch. The length L1 of eutectic region 188 may also be about equal to (e.g., with about ten percent of) the length L2 of intermetallic region 190.

Eutectic region 188 of metallurgical joint 186 also defines a thickness T1, e.g., along the radial direction R. Similarly, intermetallic region 190 of metallurgical joint 186 defines a thickness T2, e.g., along the radial direction R. The thicknesses T1, T2 of eutectic and intermetallic regions 188, 190 may be any suitable thicknesses. For example, the thicknesses T1 of eutectic region 188 may be greater than the thicknesses T2 of intermetallic region 190. In particular, the thicknesses T1 of eutectic region 188 may be greater than one ten-thousandths of an inch, such as about (e.g., with about fifty percent of) four ten-thousandths of an inch. The thicknesses T2 of intermetallic region 190 may be less than one tenth of the thicknesses T1 of eutectic region 188, such as about (e.g., with about fifty percent of) five hundred-thousandths of an inch.

Eutectic region 188 and intermetallic region 190 may assist with strengthening metallurgical joint 186 and thereby provided better coupling between aluminum and copper tubes 178, 180. For example, eutectic region 188 on aluminum tube 178 and intermetallic region 190 on copper tube 180 provides chemical and mechanical binding between aluminum tube 178 and copper tube 180. Thus, step 550 of method 500 provides annealing of the dissimilar metals within jumper tube 172 in order to assist with chemical mixing of copper from copper tube 180 and aluminum from aluminum tube 178 via diffusion at metallurgical joint 186. Atom transport between copper tube 180 and aluminum tube 178 at metallurgical joint 186 during step 550 assists with providing a rugged coupling between the dissimilar metals of jumper tube 172 and assists with improving reliability of jumper tube 172 and evaporator 128. Thus, a reliability of water heater appliance 100 may also be improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tube coupling defining an axial direction, a radial direction and a circumferential direction, the tube coupling comprising:
    an aluminum tube; and
    a copper tube extending between a first end portion and a second end portion along the axial direction, the copper tube positioned within the aluminum tube at the first end portion of the copper tube, the copper tube and the aluminum tube defining a metallurgical joint therebetween at the first end portion of the copper tube, the metallurgical joint comprising a eutectic region and an intermetallic region, the eutectic region of the metallurgical joint extending along the radial direction between the aluminum tube and the intermetallic region of the metallurgical joint, the intermetallic region of the metallurgical joint extending along the radial direction between the eutectic region of the metallurgical joint and the copper tube,
    wherein the eutectic region and the intermetallic region of the metallurgical joint extend about the copper tube along the circumferential direction wherein the eutectic region of the metallurgical joint comprises more than thirty percent copper by weight and less than forty percent copper by weight and the eutectic region of the metallurgical joint comprises less than seventy percent aluminum by weight and more than sixty percent aluminum by weight, the intermetallic region of the metallurgical joint comprises more than fifty percent copper by weight and less than sixty percent copper by weight and the intermetallic region of the metallurgical joint comprises less than fifty percent aluminum by weight and more than forty percent aluminum by weight.

2. The tube coupling of claim 1, wherein the eutectic region of the metallurgical joint defines a length along the axial direction, the length of the eutectic region being greater than one sixteenth of an inch, the intermetallic region of the metallurgical joint defining a length along the axial direction, the length of the intermetallic region being greater than one sixteenth of an inch.

3. The tube coupling of claim 1, wherein the eutectic region of the metallurgical joint defines a thickness along the radial direction, the thickness of the eutectic region being greater than one ten-thousandths of an inch, the intermetallic region of the metallurgical joint defining a thickness along the radial direction, the thickness of the intermetallic region being less than the thickness of the eutectic region.

4. An evaporator for a hot water heater appliance comprising the tube coupling of claim 1.

5. A method for forming a tube coupling, comprising:
    positioning a copper tube adjacent an aluminum tube such that the copper tube extends between a first end portion and a second end portion along the axial direction and is in axial alignment with the aluminum tube;
    heating at least one of the copper tube and the aluminum tube to at least a eutectic temperature of aluminum and copper;
    urging the copper tube and the aluminum tube together such that the first end portion of the copper tube is disposed within the aluminum tube;
    cooling the copper tube and the aluminum tube in order to form a metallurgical joint between the copper tube and the aluminum tube; and
    annealing the copper tube and the aluminum tube after said step of cooling, the metallurgical joint having a eutectic region and an intermetallic region after said step of annealing, the eutectic region of the metallurgical joint positioned between the aluminum tube and the intermetallic region of the metallurgical joint along a radial direction of the tube coupling, the intermetallic region of the metallurgical joint positioned between the eutectic region of the metallurgical joint and the copper tube along the radial direction of the tube coupling, the eutectic region and the intermetallic region of the metallurgical joint extending about the copper tube along the circumferential direction wherein the eutectic region of the metallurgical joint comprises more than thirty percent copper by weight and less than forty percent copper by weight and the eutectic region of the metallurgical joint comprises less than seventy percent aluminum by weight and more than sixty percent aluminum by weight after said step of annealing, the intermetallic region of the metallurgical joint comprising more than fifty percent copper by weight and less than sixty percent copper by weight and the intermetallic region of the metallurgical joint comprises less than fifty percent aluminum by weight and more than forty percent aluminum by weight after said step of annealing.

6. The method of claim 5, wherein said step of annealing comprises heating the copper tube and the aluminum tube to a particular temperature and maintaining the copper tube and the aluminum tube at the particular temperature for a period of time.

7. The method of claim 6, wherein said step of annealing comprises heating the copper tube and the aluminum tube to the particular temperature in an inert atmosphere.

8. The method of claim 6, wherein the particular temperature is greater than five hundred degrees Fahrenheit and less than seven hundred degrees Fahrenheit.

9. The method of claim 8, wherein the period of time is greater than thirty minutes and less than twenty-four hours.

10. The method of claim 6, wherein the period of time is greater than thirty minutes and less than twenty-four hours.

11. The method of claim 5, wherein the eutectic region of the metallurgical joint defines a thickness along the radial direction, the thickness of the eutectic region being greater than one ten-thousandths of an inch after said step of annealing, the intermetallic region of the metallurgical joint defining a thickness along the radial direction, the thickness of the intermetallic region being less than the thickness of the eutectic region after said step of annealing.

12. The method of claim 11, wherein the thickness of the intermetallic region is less than one tenth of the thickness of the eutectic region after said step of annealing.

13. The method of claim 5, further comprising mounting the aluminum tube to an evaporator of a hot water heater appliance.

14. The method of claim 13, Wherein said step of mounting comprises brazing the aluminum tube to the evaporator of the hot water heater appliance.

15. An evaporator for a hot water heater appliance, comprising an aluminum evaporator conduit having an opening, the opening of the aluminum evaporator conduit configured for directing refrigerant therethrough; and
a jumper tube positioned adjacent the aluminum evaporator conduit, the jumper tube defining an axial direction and a radial direction, the jumper tube comprising
an aluminum tube mounted to the aluminum evaporator conduit at the opening of the aluminum evaporator conduit; and
a copper tube extending between a first end portion and a second end portion along the axial direction, the copper tube positioned within the aluminum tube at the first end portion of the copper tube, the copper tube and the aluminum tube defining a metallurgical joint therebetween at the first end portion of the copper tube, the metallurgical joint comprising a eutectic region and an intermetallic region, the eutectic region of the metallurgical joint positioned between the aluminum tube and the intermetallic region of the metallurgical joint along the radial direction, the intermetallic region of the metallurgical joint positioned between the eutectic region of the metallurgical joint and the copper tube along the radial direction,
wherein the eutectic region and the intermetallic region of the metallurgical joint extend about the copper tube along the circumferential direction wherein the eutectic region of the metallurgical joint comprises more than thirty percent copper by weight and less than forty percent copper by weight and the eutectic region of the metallurgical joint comprises less than seventy percent aluminum by weight and more than sixty percent aluminum by weight, the intermetallic region of the metallurgical joint comprises more than fifty percent copper by weight and less than sixty percent copper by weight and the intermetallic region of the metallurgical joint comprises less than fifty percent aluminum by weight and more than forty percent aluminum by weight.

16. The evaporator of claim 15, wherein the eutectic region of the metallurgical joint defines a length along the axial direction, the length of the eutectic region being greater than one sixteenth of an inch, the intermetallic region of the metallurgical joint defining a length along the axial direction, the length of the intermetallic region being greater than one sixteenth of an inch.

17. The evaporator of claim 15, wherein the eutectic region of the metallurgical joint defines a thickness along the radial direction, the thickness of the eutectic region being greater than one ten-thousandths of an inch, the intermetallic region of the metallurgical joint defining a thickness along the radial direction, the thickness of the intermetallic region being less than the thickness of the eutectic region.

* * * * *

UNITED STATES PATENT AND TRADEMARK OFFICE
CERTIFICATE OF CORRECTION

PATENT NO. : 9,950,381 B2  
APPLICATION NO. : 14/446647  
DATED : April 24, 2018  
INVENTOR(S) : Leezer et al.

Page 1 of 1

It is certified that error appears in the above-identified patent and that said Letters Patent is hereby corrected as shown below:

In the Claims

In Column 11, Line 9, "along the" should read "along a";

In Column 11, Line 52, "Wherein" should read "wherein".

Signed and Sealed this  
Seventeenth Day of July, 2018

Andrei Iancu  
*Director of the United States Patent and Trademark Office*